March 15, 1960

O. W. HOSKING 2,928,447

CHECK VALVE

Filed Oct. 29, 1954

INVENTOR.
Oakley W. Hosking
BY
Johnson and Kline
ATTORNEYS

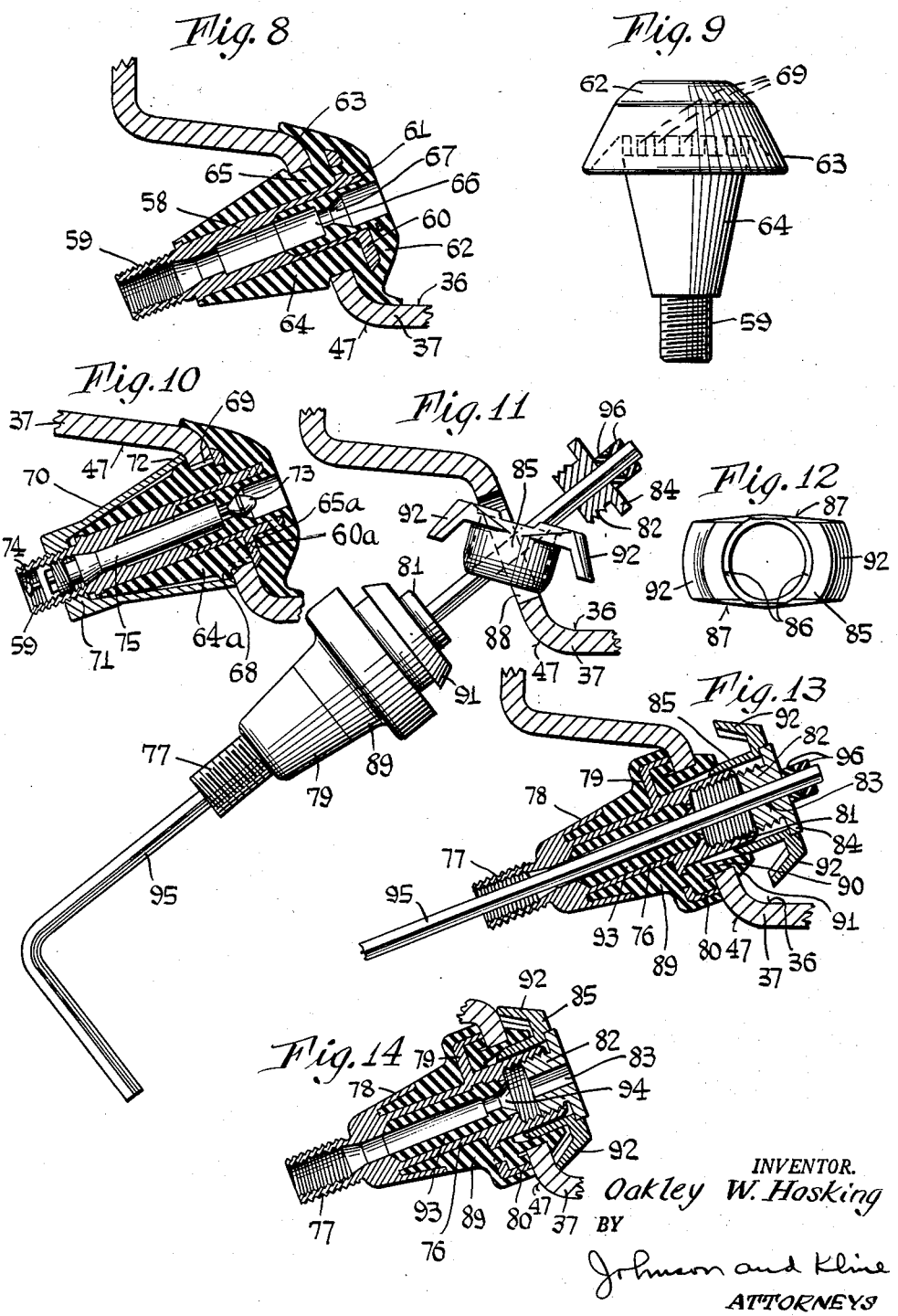

March 15, 1960 O. W. HOSKING 2,928,447
CHECK VALVE
Filed Oct. 29, 1954 4 Sheets-Sheet 3

INVENTOR
Oakley W. Hosking
BY Johnson and Kline
ATTORNEYS

March 15, 1960

O. W. HOSKING 2,928,447

CHECK VALVE

Filed Oct. 29, 1954

INVENTOR
Oakley W. Hosking
BY Johnson and Kline
ATTORNEYS

United States Patent Office 2,928,447
Patented Mar. 15, 1960

2,928,447

CHECK VALVE

Oakley W. Hosking, Monroe, N.Y., assignor to Hosking Patent Corporation, New York, N.Y., a corporation of New York Application October 29, 1954, Serial No. 465,591

10 Claims. (Cl. 152—427)

This invention relates to check valves, and more particularly to air check valves, especially of the type used for automobile tires.

The invention is illustrated and described herein mainly in connection with tubeless tire valves. A further illustrated use involves the application of a check valve to a compresed air tank; however, it should be understood that the invention is not limited to the specific structures and applications illustrated herein, since it has utility in connection with various pressurized devices having the need for an air check valve.

An object of the invention is to provide an improved, simple and efficient air check valve adapted to be mounted on an automobile wheel rim, for use with tubeless tires.

Another object of the invention is to provide an improved tubeless tire valve as above set forth, wherein a metal-to-metal clamping action is had with the automobile wheel.

A further object of the invention is to provide an improved air check valve for incorporation in a rigid wall of a pressurized vessel, said valve being so arranged and constructed that an increase in the air pressure will tend to more tightly seal the valve to the wall.

A still further object of the invention is to provide an improved tubeless tire valve wherein a rigid and sturdy guard is provided to protect the exterior exposed portion of the valve, thereby to provide a safeguard against damage if the valve should inadvertently come in contact with resistive objects during rotation of the wheel.

A feature of the invention resides in the provision of an improved guarded or protected valve as above set forth, wherein the protective shield may be easily and quickly removed and yet is securely tightly held in its operative position during use.

Still another object of the invention is to provide an improved tubeless tire valve which is readily applicable without change to different sizes and shapes of wheel rims.

Still another object of the invention is to provide an improved air check valve in accordance with the above, which may be easily and quickly applied to the supporting wall, and which may be easily changed or replaced when desired.

Another feature of the invention resides in the provision of a tubeless tire valve having a body formed largely of rubber and having a metal shield for the body so arranged and organized that no rubber portions of the body are exposed at the exterior.

A still further object of the invention is to provide an improved tubeless tire valve which may be easily and quickly applied to the wheel rim from the inside, without use of any tools whatsoever.

Still another object of the invention is to provide an improved tubeless tire valve which may be applied to the wheel rim from the exterior, even though the tire is on the rim.

Another feature of the invention is the provision of a tubeless tire valve which is insertable in the rim from the exterior, and wherein a strong and sturdy metal-to-metal clamping action is had with the wheel rim.

Other features of the invention reside in the provision of an improved tubeless tire valve having a flexible sealing means engageable with the wheel rim and a flexible valve seat in the stem or body portion, said sealing means and valve seat being integral with each other to insure against leakage of air and to simplify the construction of the valve, and the provision of tubeless tire and air check valves in accordance with any or all of the foregoing, which are simple in construction, having but few parts, and which may be inexpensively manufactured.

Other features and advantages will hereinafter appear.

In the accompanying drawings:

Fig. 8 is an axial sectional view of a push-through type valve made in accordance with the invention, adapted to be applied to the wheel rim from the inside without the use of any tools whatsoever.

Fig. 9 is a side elevational view of another form of push-through valve made in accordance with the invention.

Fig. 10 is an axial sectional view of the valve of Fig. 9, applied to a wheel rim and having incorporated with it a conical metal shield or guard for the body or stem portion of the valve.

Fig. 11 is a view partly in side elevational and partly in axial section, of a check valve made according to the invention, in the process of being applied from the exterior of the wheel rim.

Fig. 12 is a top view of a clamping collar of the valve of Fig. 11.

Fig. 13 is an axial sectional view of the valve of Fig. 11 partly applied to the wheel rim.

Fig. 14 is an axial sectional view of the valve of Figs. 11 and 13, completely tightened on the wheel rim.

Figure 1:
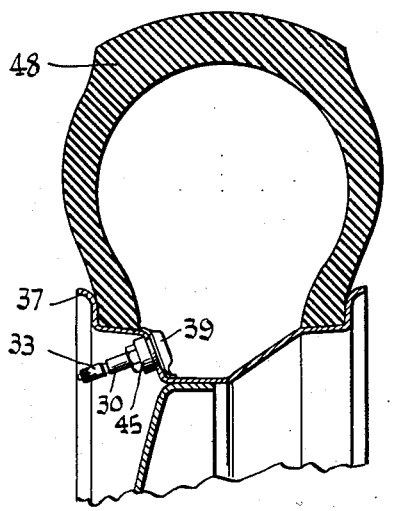
Figure 1 is a fragmentary transverse sectional view of a tubeless tire and wheel rim employing an improved metal-to-metal clamping type air check valve made in accordance with the invention.
Figure 2:
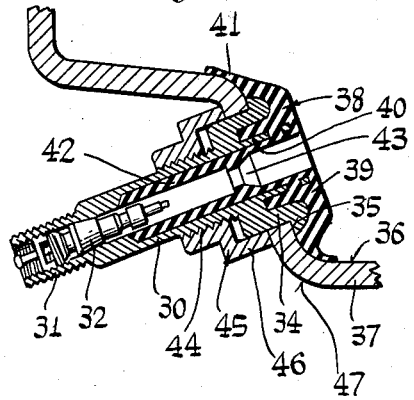
Fig. 2 is an axial sectional view through the valve of Fig. 1.

The improved air check valve shown in Figs. 1 and 2 comprises a metal body or stem portion 30 of tubular construction, having at its exterior end a reduced neck 31 which is internally threaded to receive a tire valve 32 and also externally threaded to accommodate a valve cap 33. The body 30 has at its inner end a portion 34 of enlarged diameter providing a shoulder 35 for engagement with the inner surface 36 of the wheel rim 37. The portion 34 of enlarged diameter of the valve body 30 is of a size to snugly fit into the opening of the wheel rim with the shoulder 35 seated against the inner wall of the rim, the body 30 being insertable in the opening from the inside of the rim.

In accordance with the present invention, to provide an effective seal between the valve body 30 and the wheel rim 37 I provide a sealing annulus 38 which is secured to the inner end of the body 30 and adapted to overlie and seal against the inside wall 36 of the rim. The annulus 38 is preferably formed of rubber or rubber-like material and has a main or body portion 39 in which is imbedded an axial, perforated extension 40 of the body 30. The main portion 38 of the sealing annulus has a flexible peripheral skirt or flange 41 which normally extends angularly outward and toward the exterior end 31 of the body 30. The normal position of the flange or skirt 41 is substantially as shown in the upper portion of Fig. 2, and the skirt is yieldable to conform to different configurations of the wheel rim 37, as shown in the lower portion of Fig. 2.

Preferably an annular groove exists between the extension 40 of the body 30 and the portion 34 of enlarged diameter, said groove being occupied by the sealing annulus to effect a more efficient seal.

The body 30 as shown in Fig. 2 may have an enlarged bore, and the rubber-like material of the sealing annulus may be extended into the bore to provide a lining 42 therefor, and to provide a valve seat 43 to accommodate a different kind of tire valve to be described later.

For the purpose of tightly securing the body 30 to the wheel rimb 37 the body is provided with exterior threads 44 and a collar 45 of metal or other rigid material is screwed on the threads 44, said collar having a portion 46 of enlarged diameter which is slidable over the body portion 34 and adapted to engage the outside wall 47 of the wheel rim.

It will be observed that by the above construction a rigid and sturdy metal-to-metal clamping action is had between the body 30 and the wheel rim 37, thereby to rigidly support the valve body on the rim. Air pressure within the tire 48 which is mounted on the rim 37 will serve to securely hold the flexible skirt 41 of the sealing annulus 38 against the inner wall 36 of the rim, and I have found that the engagement between the rim and the sealing annulus is so intimate that virtually a perfect seal is obtained, preventing any appreciable leakage of air whatsoever from the tire 48 through the valve. The seal effected by the annulus 38 is independent of the clamping action of the collar 45, and in actual use the collar merely serves to prevent accidental dislodgment of the valve body 30 from the rim. The collar 45 may be removed while pressure exists in the tire 48, the said pressure securely retaining the valve body in place, and securely holding the annulus 38 in sealing engagement with the wheel rim 37.

Figure 3:
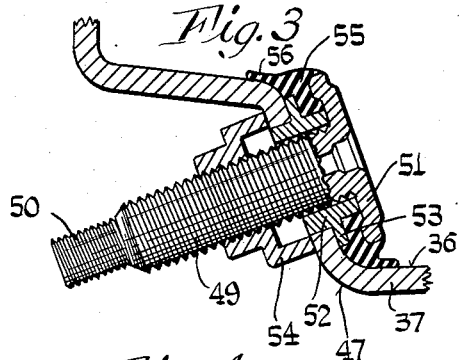
Fig. 3 is an axial sectional view of a valve illustrating another form of the invention.
Figure 4:
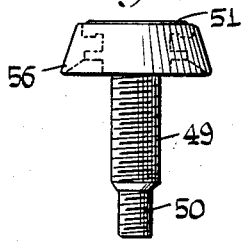
Fig. 4 is a side elevational view of an assembly of valve stem or body and sealing flange, of the valve of Fig. 3.
Figure 5:
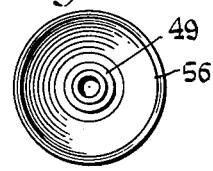
Fig. 5 is a top view of the assembly shown in Fig. 4.

Another embodiment of the invention is shown in Figs. 3–5. In these figures a tubular stem or body 49 is provided, having a reduced neck portion 50 threaded inside and out to accommodate a tire valve and a tire valve cap respectively. At its inner end the body 49 has an integral flange or shoulder 51 of larger diameter than the opening in the wheel rim 37. On the body 49 a sleeve 52 is provided, adapted to be received in the opening of the wheel rim and having intermediate its ends an outwardly projecting shoulder 53. A clamping collar 54 is provided on the body 49, having internal threads by means of which it may be pulled up against the exterior wall 47 of the rim, causing the latter to be clamped between the collar 54 and the shoulder 53 of the sleeve 52.

For the purpose of providing an effective seal between the valve stem body 49 and the wheel rim 37 I provide a sealing annulus 55 interposed between the shoulders 51 and 53. The annulus 55 has a flexible skirt portion 56 extending around its periphery and engageable with the inner wall 36 of the wheel rim 37 to provide a seal therewith. In this form of the invention the stem body comprising the tubular portion 49 and the flange or shoulder 51 thereof is a component part of a valve stem as currently employed with rubber inner tubes for tires. This component part, being currently produced in quantity, is available on the market and accordingly the only additional parts required are the sleeve 52, collar 54 and annulus 55 in order to adapt the body 49 for use with a wheel rim, to provide a tubeless tire valve.

Figure 6:
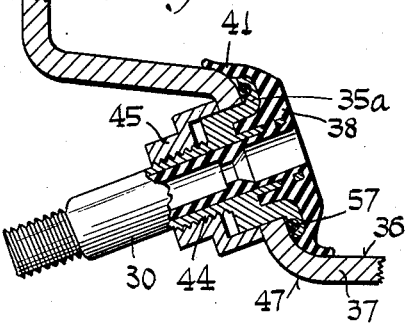
Fig. 6 is an axial sectional view partly in elevation of a valve illustrating another form of the invention.
Figure 7:
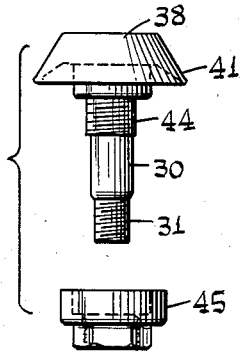
Fig. 7 is an exploded view of the clamping components of the valve of Fig. 6.

Another form of the invention is shown in Figs. 6 and 7. The valve shown in these figures is similar in most respects to that shown in Figs. 1 and 2, and similar components or portions have been given like characters. The difference between the valve of Fig. 6 and that of Fig. 2 resides in the seal provided against the inner wall 36 of the wheel rim 37. In Fig. 6 the body portion 30 has an outwardly projecting shoulder 35a provided with an annular recess in which an O-ring 57 is disposed, said O-ring being formed of rubber or rubber-like material and being adapted to engage the inner wall 36 of the wheel. Preferably the O-ring 57 has sufficient mass to cause it to be compressed and held tightly against the inner wall 36 when the collar 45 is pulled up tight on the threads 44. By this arrangement a double seal is effected, one seal being provided by the skirt portion 41 of the annulus 38 and the other seal being provided by the O-ring 57 held captive in the shoulder 35a.

Another form of the invention is shown in Fig. 8. The valve shown in this figure comprises a tubular, rigid stem or body portion 58 having an internally and externally threaded neck 59 and having adjacent its inner end an outwardly projecting annular shoulder or flange 60 adapted to be disposed within the wheel rim 37 of the wheel. The body 58 has an inward, perforated extension 61, said extension and shoulder being imbedded in a sealing annulus 62. The annulus 62 has a peripheral flange or skirt 63 for sealing engagement with the inner wall 36 of the rim 37. Molded around the tubular rigid body portion 58 is a tapered sleeve 64, said sleeve being preferably integral with the annulus 62 and having a portion 65 of reduced diameter, which is disposed in the opening in the wheel rim 37. The portion 65 has a peripheral surface which constitutes the bottom of an annular groove between the portion 64 and the annulus 62, and by virtue of the yieldable nature of the sleeve 64 it may be forced through the opening in the rim 37 until the edges of the opening in the rim occupy the groove between the sleeve portion 64 and the annulus 62. Thus the valve shown in Fig. 8 may be pushed through from the inside out and set in place without requiring the use of any tools whatsoever.

The bore of the tubular body portion 58 is enlarged from the inner end thereof, and a lining 66 is provided, of resilient material having a valve seat 67 cooperable with a valve shortly to be described. The lining 66 is preferably integral with the annulus 62 and the sleeve 64.

Another embodiment of the invention is shown in

Figs. 9 and 10. The valve shown in these figures is similar in many respects to that shown in Fig. 8, and like parts have accordingly been given the same characters. The valve of Figs. 9 and 10 differs in that the tubular body portion 58 has an annular perforated shoulder 60a which is placed further from the inner extremity of the body portion and is adapted to engage the inner surface 36 of the wheel rim 37. The exterior of the sleeve 64a of the valve of Figs. 9 and 10 is provided with less of a taper, to enable a shoulder 68 to be formed where the sleeve engages the outer surface 47 of the wheel rim. The connector portion 65a of the valve shown in Figs. 9 and 10 is provided with a plurality of recesses or pockets 69, thereby to prevent a seal from being effected between said connector portion and the inner edges of the opening in the wheel rim. I have found that in some circumstances this is advantageous in enabling the skirt 63 of the sealing annulus to be quickly completely collapsed and held in sealing engagement with the inner wall 36 of the wheel rim 37 by the internal air pressure.

In order to provide a guard for the valve, and to enhance its appearance, a conical metal shell 70 is provided, said shell having internal threads at its small end 71 to enable it to be screwed onto the neck 59 of the valve. Preferably the small end 71 of the shell 70 is made hexagonal to enable it to be tightened by a wrench. The shell 70 at its large end 72 engages the exterior surface 47 of the rim 37, and by this construction the rim is clamped between the metal shell 70 and the metal shoulder 60a, providing a firm mounting for the valve.

In Fig. 10 a valve member 73 is provided, cooperable with the valve seat 67, said valve being carried on a pin 74 slidable in a tubular body member 75 which is threaded into the neck 59. The member 75 extends deeply into the stem 58 and engages and backs up the valve seat 67, thereby preventing the valve 73 from being forced entirely through the seat.

Another embodiment of the invention wherein the valve is insertable from the front of the wheel, is shown in Figs. 11–14. The valve in these figures comprises a rigid tubular stem 76 having at its outer end an internally and externally threaded neck 77 and having a flared skirt 78 secured to the neck and spaced from the stem 76. A shoulder 79 is provided on the stem 76, having an axially extended flange 80 engageable with the outer surface 47 of the wheel rim 37. At its inner end 81 the stem 76 is internally threaded to receive a screw 82 having a hexagonal bore 83 and having a circular head or flange 84. A clamping collar 85 is arranged to be slidably carried by the inner end 81 of the stem, said collar having a circular recess 86 to accommodate the head 84 of the screw. The collar 85 has opposite, flat sides 87 by virtue of which it may be passed through the opening 88 in the rim 37 when the collar is tilted in the manner shown in Fig. 11.

The valve has a molded rubber portion comprising an outer sleeve 89 molded around the stem 76 and also around the shoulder 79 and flange 80. The sleeve 89 has an inner end portion 90 provided with a tapered extremity forming an outer annular shoulder 91, the portion 90 being adapted to extend through the opening 88 in the rim and the shoulder 91 being engageable with the inner surface 36 of the rim. The collar 85 has angularly extending lugs 92 engageable with the inner surface 36 of the rim whereby the latter may be tightly clamped between the lugs and the flange 80 of the shoulder 79 which is integral with the stem 76 upon the screw 82 being tightened.

Within the stem 76 a rubber lining 93 is molded, shaped to provide a valve seat 94 as in the other forms of the invention. Assembly of the valve shown in Figs. 11 through 14 to the wheel rim is accomplished by an elongate Allen wrench 95 which may be passed through the stem 76 and lining 93. The wrench 95 is extended beyond the inside of the valve body, and the collar 85 is slipped on the wrench, together with the screw 82. The hexagonal bore 83 of the screw 82 closely fits the cross section of the wrench 95 to enable the latter to tighten the screw. Preferably a pair of small rubber collars 96 is provided on the end of the wrench 95, to facilitate manipulation of the screw 82 without danger of the screw falling off the end of the wrench prematurely. As shown in Fig. 11, with the valve parts assembled on the wrench 95 they are applied to the wheel rim 37 to bring the screw 82 and collar 85 on the inside of the rim. The valve body is then pressed into the opening 88 of the rim and the wrench 95 manipulated to bring the collar 85 and screw 82 into cooperable relationship as shown in Fig. 13. The screw 82 is then tightened, forcing the collar 85 into the opening 88, and forcing the lugs 92 of the collar against the inside of the rim. The collar 85 will expand the portion 90 of the rubber against the edges of the opening 88, causing a tight seal. After the valve has been tightly screwed to the rim, the wrench 95 may be removed, and the small rubber collars 96 will remain loose in the tire. Due to their extremely small mass and weight, the collars 96 will have no deleterious effect within the tire.

Figure 15:
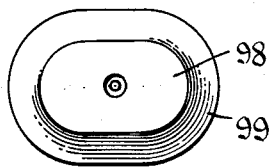
Fig. 15 is a top view of a valve illustrating a modification of the invention wherein the sealing skirt is of lozenge shape.
Figure 16:
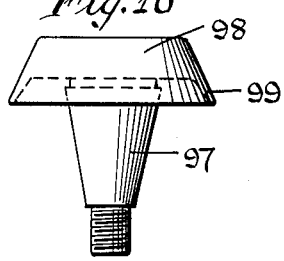
Fig. 16 is a side elevational view of the valve of Fig. 15.
Figure 17:
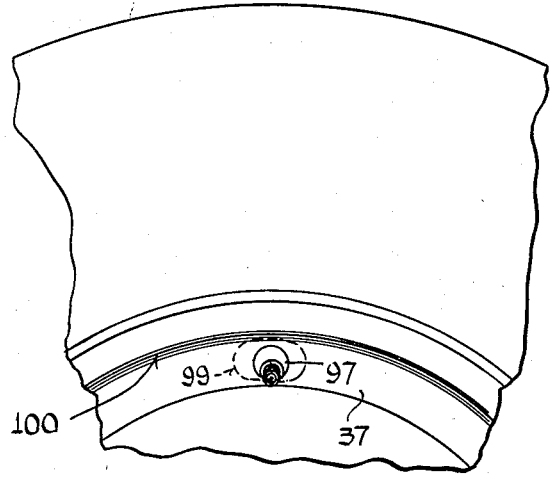
Fig. 17 is a fragmentary elevational view of an automobile tire and rim, the latter having applied to it the valve shown in Figs. 15 and 16.

Another embodiment of the invention is shown in Figs. 15–17. In these figures a valve stem 97 is provided with a sealing annulus 98 of lozenge shape, having a depending skirt 99 arranged to engage the inside wall of the wheel rim 37. The annulus 98 and skirt 99 are positioned as shown in Fig. 17, and by virtue of the oval or lozenge shape of the annulus the skirt 99 will be caused to closely hug the inner wall of the rim even though the rim extends forwardly at a relatively sharp angle in providing the tire engaging shoulder 100.

A valve made in accordance with another form of the invention is shown in Figs. 18–22. The valve in these figures comprises a tubular rigid stem portion 101 having an internally and externally threaded outer extremity or neck 102 to accommodate the valve element and the cap. The stem 101 has an enlarged bore 103 provided with a molded rubber lining 104 shaped to provide a valve seat 105. Within the bore of the stem 101 a valve assemblage is provided consisting of a tubular body member 106 carrying a stem 107 on the inner end of which a valve 108 is mounted, said valve being engageable with the valve seat 105 to check the flow of air from the tire.

Figure 18:
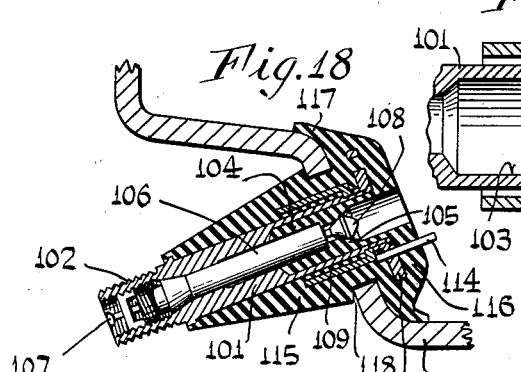
Fig. 18 is an axial sectional view of a valve illustrating another form of the invention, wherein the valve stem is expansible against the edge portions of the mounting aperture.
Figure 20:
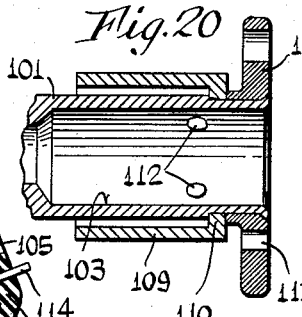
Fig. 20 is a sectional view taken on line 20—20 of Fig. 19.
Figure 19:
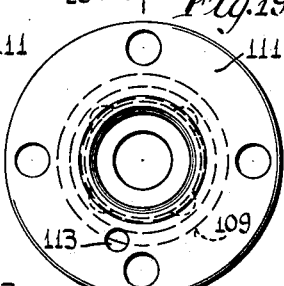
Fig. 19 is an inside end view of the rigid portion of the body of the valve of Fig. 18.
Figure 21:
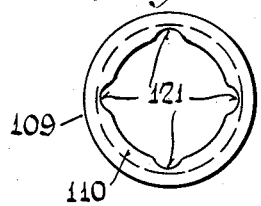
Fig. 21 is an end view of a rigid non-adherent collar constituting one of the component part of the rigid body of Figs. 18–20.
Figure 22:
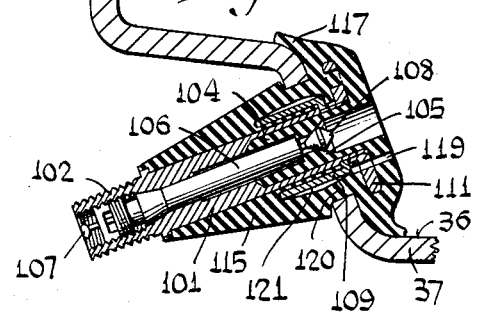
Fig. 22 is an axial sectional view like Fig. 18 showing the position of the parts when the valve is under pressure.

In accordance with the present invention, on the inner end of the stem 101 a sleeve 109 is provided, spaced from the stem by means of an inturned end flange 110. Also carried by the inner extremity of the stem 109 is an apertured flange member 111. The valve stem portion 101 and the flange 111 are preferably of brass, and the sleeve 109 is preferably made of steel. The stem 101 has apertures 112 to provide flow channels for the rubber molding process, and the flange 111 has an aperture 113 which is adapted to accommodate a pin 114 as shown in Fig. 18. Rubber is molded about the stem portion 101, the sleeve 109 and the flange 111 in the form substantially as shown in Fig. 18, to provide a tapered outer sleeve 115 around the stem 101, and a sealing annulus 116 with a flexible peripheral skirt 117. An annular groove 118 is molded between the sleeve 115 and the annulus 116, to accommodate the edge portions of the opening in the wheel rim 37. After the molding of the rubber has been completed the pin 114 is withdrawn from the valve and discarded, leaving a channel 119, Fig. 22. The valve shown in Figs. 18 and 22 is adapted to be pushed through the opening in the rim from the inside, until it is properly positioned as shown. By virtue of the stem 101 and the flange 111 being of brass, the rubber will adhere to these parts but it will not adhere to the sleeve 109 of steel. Thus when air pressure is introduced into the tire the air will pass through the passage 119 and expand the connector portion 120 of the sleeve 115 as shown in Fig. 22. This air will occupy the spaces indicated at 121 in Fig. 22. The expansion of the connector portion 120 is made possible because of the non-adhesion of said portion to the steel of the sleeve 109. Such expansion, however, forces the connector portion 120 against the edges of the opening in the wheel rim, effecting a tight seal therewith. In addition to this, the flexible peripheral skirt 117 of the sealing annulus 116 will seal tightly against the inner surface 36 of the rim. By this construction a double seal is effected. If desired, as shown in Fig. 21, the inner periphery of the flange 110 of the sleeve 109 may have notches 121 to enable air to pass between the inside surface of the sleeve and a rubber occupying the space between the sleeve and the stem 110, thus providing extra passage for the air which expands the connector portion 120.

Figure 23:
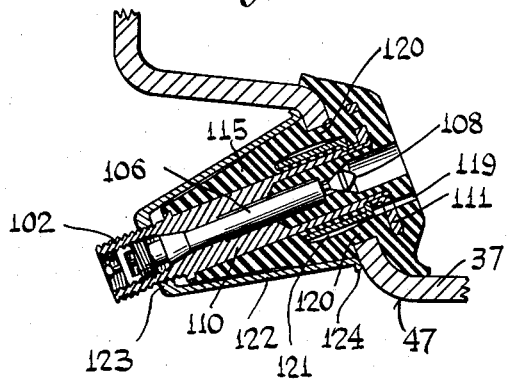
Fig. 23 is an axial sectional view of the valve shown in Figs. 18 and 22, but with the addition of a rigid guard member for protective and ornamental purposes.

By this invention the expansion of the connector portion 120 of the valve shown in Figs. 18 and 22 may be advantageously utilized to lock a protective shield or shell to the valve. As shown in Fig. 23 a conical shell 122 may be provided having its small end 123 internally threaded to enable it to be screwed onto the neck 102 of the stem. The large end of the shell 122 has an outturned flange 124 which is engageable with the outer surface 47 of the wheel rim 37. When the shell 122 is screwed up tight, and after air is introduced into the tire, the expansion of the connector portion 120 and adjacent portions of the molded sleeve 115 will cause the sleeve to tightly grip the shell 122 and prevent the latter from becoming loose.

Figure 24:
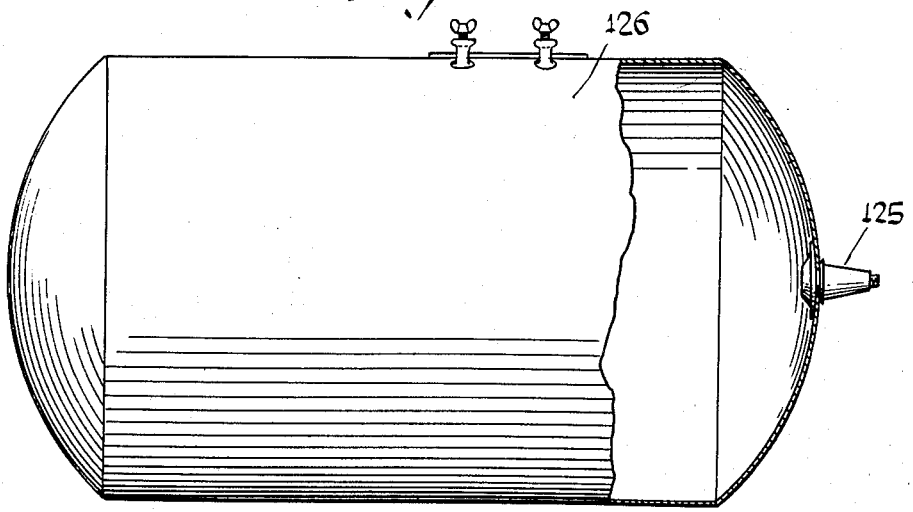
Fig. 24 is a view partly in elevation and partly in section of a compressed air tank utilizing an air check valve made in accordance with the invention.

Fig. 24 illustrates the use of an improved valve 125 of the present invention on a compressed air tank 126.

The improved valve of the present invention, as set forth above, provides an extremely effective and reliable seal when used in conjunction with automobile rims and tubeless tires. Over an extended period of time no leakage of air will be experienced from the use of the valve. The valve is seen to be simple in construction, having relatively few parts, and to be inexpensive to manufacture. With some forms of the invention a rigid metal-to-metal clamping action is had with the wheel rim; in other forms of the invention a durable metal shield is provided, enclosing the valve and safeguarding it from minor blows. The valve is seen to be easily and quickly applied, and also easily and quickly replaced. It is arranged so that it can be used with different sizes and shapes of wheel rims, and has utility in other applications, as for example for compressed air tanks or other pressurized devices using compressed air. The protective shell is securely held against loosening by the air pressure existing within the valve, and in several forms of the invention a double seal is effected.

One form of valve disclosed herein may be applied from the front of the wheel, while the tire is in place, while other forms are adapted to be inserted from the interior of the rim. In several forms of the invention the sealing annulus and the valve seat are integral, thereby insuring a reliable and effective seal.

Variations and modifications may be made within the scope of the claims and portions of the improvements may be used without others.

I claim:

1. A combined valve stem and attaching means therefor adapted to be secured to a tubeless tire rim of an automobile wheel in an opening thereof, comprising an elongate tubular body adapted to be inserted in said rim opening from the inside of the rim and carrying a resilient, laterally, outwardly projecting flange at the base of the body adapted to be pressed into sealing engagement with the inside surface of the rim, said body having a rigid portion larger than the opening in the rim adapted to engage the inner surface of the rim to prevent the sealing flange from being collapsed and forced through said opening; and means on said body adapted to engage the outside surface of the rim for holding the body in place in the said opening.

2. The invention as defined in claim 1 in which the means adapted to engage the outside surface of the wheel rim comprises a collar threaded to the body, and in which the said rigid portion of the body comprises a shoulder cooperable with said collar and adapted to clamp the rim therebetween.

3. A combined valve stem and attaching means therefor adapted to be secured to a rigid supporting wall having inner and outer sides and an opening extending therethrough, comprising an elongate tubular body having a base and insertable in the said wall opening from the inner side of the wall and carrying a laterally, outwardly projecting shoulder at the base of the body for engagement with the inner side of said wall and of a larger size than the opening; a collar movably carried by said body for engagement with the opposite side of the supporting wall; cooperable means on the body and collar, for forcing the collar toward said shoulder to clamp the wall therebetween; and a resilient sealing annulus secured to the said base of the body and having an axially-movable peripheral skirt portion extending substantially beyond the shoulder and adapted for sealing engagement with said inner side of the wall by conforming to the shape of the wall.

4. The invention as defined in claim 3 in which the collar is tapered, the smaller end of the collar having part of said cooperable means and the larger end of the collar being engageable with the said outer side of the supporting wall, and in which the body has a resilient tapered portion located adjacent the outer side of the wall and closely fitting inside and engaging the collar to maintain the latter tight on the body, said collar being provided with a bore through which fluid can pass through the valve.

5. The invention as defined in claim 3 in which there is a second shoulder at the said base of the body axially spaced from the first, and in which the sealing annulus is partially clamped between both said shoulders.

6. The invention as defined in claim 5 in which the first shoulder engaging the inner side of the wall is slidably carried on the body and has a portion abutting the said second shoulder and another portion constituting a bushing and passing into the opening of the wall.

7. The invention as defined in claim 3 in which the shoulder is annular, and in which there is a resilient O-ring carried by said shoulder and engageable with the said inner side of the supporting wall to seal the shoulder thereto.

8. A combined valve stem and attaching means therefor adapted to be secured to a rigid supporting wall having inner and outer sides and an opening extending therethrough, comprising an elongate tubular body insertable in the said wall opening from the inner side of the wall and carrying intermediate its ends a laterally, outwardly projecting shoulder for engagement with the inner side of said wall and of a size larger than the opening; a collar movably carried by said body for engagement with the outer side of the supporting wall; cooperable means on the body and collar, for forcing the collar toward said shoulder to clamp the wall therebetween; and a resilient sealing annulus secured to said body and having an axially movable peripheral skirt extending substantially beyond the shoulder and engaging the inner side of the supporting wall to seal the body to the wall by conforming to the shape of the wall.

9. A combined valve stem and attaching means therefor adapted to be secured to a rigid supporting wall having inner and outer sides and an opening extending therethrough, comprising an elongate tubular body having a base and insertable in the said wall opening from the inner side of the wall and carrying a laterally, outwardly projecting shoulder at the base of the body for engagement with the inner side of said wall and of a larger size than the opening; a collar movably carried by said body for engagement with the opposite side of the supporting wall; cooperable means on the body and collar, for forcing the collar toward said shoulder to clamp the wall therebetween; and a resilient sealing annulus secured to the said base of the body and having an axially-movable peripheral skirt portion extending substantially beyond the shoulder and adapted for sealing engagement with said inner side of the wall by conforming to the shape of the wall, in which there is a resilient valve seat within the body, the sealing annulus and valve seat are integral with each other and means on the body for supporting a valve core.

10. A combined valve stem and attaching means therefor adapted to be secured to a rigid supporting wall having inner and outer sides and an opening extending therethrough, comprising an elongate tubular body having a base and insertable in the said wall opening from the inner side of the wall and carrying a laterally, outwardly projecting shoulder at the base of the body for engagement with the inner side of said wall and of a larger size than the opening; a collar movably carried by said body for engagement with the opposite side of the supporting wall; cooperable means on the body and collar, for forcing the collar toward said shoulder to clamp the wall therebetween; and a resilient sealing annulus secured to the said base of the body and having an axially-movable perpiheral skirt portion extending substantially beyond the shoulder and adapted for sealing engagement with said inner side of the wall by conforming to the shape of the wall, and in which the base of the body and the sealing annulus have interlocking engagement.

References Cited in the file of this patent
UNITED STATES PATENTS

| | | |
|---|---|---|
| 1,426,721 | Erik | Aug. 22, 1922 |
| 1,452,284 | Steinmetz | Apr. 17, 1923 |
| 2,054,965 | Clo | Sept. 22, 1936 |
| 2,475,451 | Gouirand | July 5, 1949 |
| 2,576,736 | Watkins | Nov. 27, 1951 |
| 2,587,470 | Herzegh | Feb. 26, 1952 |
| 2,634,785 | Tubbs | Aug. 14, 1953 |
| 2,652,858 | Snyder | Sept. 22, 1953 |
| 2,685,907 | Waddell | Aug. 10, 1954 |